United States Patent [19]
Kos

[11] Patent Number: 5,900,039
[45] Date of Patent: May 4, 1999

[54] PROCESS FOR OBTAINING FLUID LIGHT METAL FROM A DISPERSED MIXTURE

[76] Inventor: Bernd Kos, Endresgasse 11, A-8700 Leoben, Austria

[21] Appl. No.: 08/790,759

[22] Filed: Jan. 27, 1997

[30]  Foreign Application Priority Data

Jan. 29, 1996 [AT] Austria ......................................... 160/96

[51] Int. Cl.⁶ ................................ C22B 9/02; C22B 21/06
[52] U.S. Cl. ................................................. 75/404; 75/672
[58] Field of Search ........................................ 75/672, 404

[56]  References Cited

U.S. PATENT DOCUMENTS

| | | |
|---|---|---|
| 4,040,820 | 8/1977 | Loach et al. . |
| 5,401,294 | 3/1995 | Kos et al. ................................. 75/672 |
| 5,421,850 | 6/1995 | Dube et al. . |
| 5,462,578 | 10/1995 | Kos . |
| 5,525,141 | 6/1996 | Kos et al. . |

FOREIGN PATENT DOCUMENTS

| | | |
|---|---|---|
| 400448 | 12/1995 | Austria . |
| 626458 | 11/1994 | European Pat. Off. . |
| 2228014 | 8/1990 | United Kingdom . |
| 9301321 | 1/1993 | WIPO . |

*Primary Examiner*—Melvyn Andrews
*Attorney, Agent, or Firm*—Greenblum & Bernstein, P.L.C.

[57]  ABSTRACT

Process for obtaining a metallic phase from a dispersed mixture composed of one of (a) at least one metal selected from the group consisting of a light metal or an alloy of the at least one metal, and mixtures thereof, and (b) at least one non-metallic phase composed of at least one member selected from the group consisting of at least one oxide, an oxide compound, and other compounds of the at least one metal at higher temperatures. The process includes introducing the dispersed mixture into a metallurgical vessel; at least one of heating and adjusting a temperature of the dispersed mixture to between 20 and 250° C. above the liquidus temperature of the metallic phase; rotating the metallurgical vessel to homogenize the dispersed mixture and to produce a pourable dispersed mixture; uniformly distributing the pourable dispersed mixture around a rotational axis of the metallurgical vessel; and increasing a radial acceleration of the pourable dispersed mixture of at least 1 g. The process further includes maintaining the radial acceleration for at least 0.015 hours to one of separate the metallic phase of the pourable dispersed mixture from the non-metallic phase of the pourable dispersed mixture and de-metallize the pourable dispersed mixture; decreasing the radial acceleration to a value of 0 in a span of time greater than 0.03 hours; pouring the metallic phase as a fluid out of the metallurgical vessel; and after pouring the metallic phase out of the metallurgical vessel, removing the at least one non-metallic phase from the metallurgical vessel.

9 Claims, 2 Drawing Sheets

PROCESS FOR OBTAINING FLUID LIGHT METAL FROM A DISPERSED MIXTURE

CROSS-REFERENCE TO RELATED APPLICATION

The present application claims priority under 35 U.S.C. §119 of Austrian Patent application No. A 160/96 filed Jan. 29, 1996.

BACKGROUND OF THE INVENTION

1. Field of the Invention

The invention relates to a process for obtaining the metallic phase from a dispersed mixture comprised of at least one light metal, in particular aluminum, or comprised of an alloy of this metal or metals and at least one non-metallic phase, constituted by at least one oxide or an oxide compound and/or other compounds of this metal or metals, if need be one or more other substances, e.g. salts or salt mixtures and the like, at higher temperatures, in particular, comprised of dross obtained in processes for producing, processing, and reclaiming aluminum and aluminum alloys when acceleration forces are used. Furthermore, the invention includes a device particularly for carrying out the above-mentioned process, essentially comprised of a metallurgical vessel that can be rotated and tilted.

2. Discussion of Background Information

A melting and in particular a processing of light metals such as aluminum, silicon, magnesium, and this type of alloys in the molten state as well as a reclaiming of these metals by means of melting scrap and materials of that kind in air produce an oxidation and a nitride formation on the surface of the melting pieces and the molten mass, because light metals have a high affinity to oxygen and nitrogen. The oxides produced and non-metallic phases develop with an angular crystalline macrostructure and have a higher specific weight than the metals. The surface tension of fluid light metal and in particular the interfacial surface tension to the high-melting oxides as well as the cavities between the crystals, though, cause the non-metallic phase to float on the fluid metal despite the comparatively higher specific weight.

The surface tension and interfacial surface tension of "fluid metal/solid non-metallic crystals", though, also cause metal particles to be held between the non-metallic crystals, by means of which the slag disposed or formed on the fluid metal bath, a so-called dross, has a high metal content, which can often be up to 80 weight %. As a result, valuable metal is taken out when the dross is removed from the surface of the molten bath, which can produce economic disadvantages when the dross is disposed of and can also cause ecological problems.

Since the beginnings of the technical employment of light metals in large quantities and a use of molten metallurgical processes, great effort has been expended for recovering the metallic phase from the dross or slag that represent a dispersed mixture.

In order to reduce the metal content of the dross, it is possible to add salt to it. This measure is in fact almost completely successful, but for the most part, though, the low-melting salt and the compounds cannot be economically reused and are water soluble as well, and bring great difficulties in handling and disposal.

It has also been proposed (U.S. Pat. No. 4,040,820) that the addition of salts be eliminated and that metal be removed from dross in a horizontal revolving cylindrical furnace that can be heated. By means of a staggered, slow movement of the dross or the dispersed mixture in the furnace, the metal particles should be brought together, united with a fluid metal part, and poured off with it. However, the metal removal gradient of the mixture was low and there were economical problems.

According to U.S. Pat. No. 5,421,850, it has been proposed that the work be likewise carried out without salt in the essentially horizontally disposed rotary furnace, that dross be placed in this furnace, that it be heated to a temperature above the liquidus temperature of the metal by means of plasma heating, and that the metal particles disposed in it be agglomerated and united with one another by means of a mixing motion. A clump formation of the charge should be counteracted by various speeds of the cylindrical furnace, wherein the metallic part formed is removed by means of a tap hole and the residual remainder of dross can be removed by means of de-drossing with a slight inclination of the furnace. The high expenditure and an insufficiently high metal removal gradient of the dispersed mixture are disadvantageous.

GB-2 228 014 A has disclosed a process in which dross or aluminum scrap is heated in a vertical revolving cylindrical furnace by means of plasma energy or a plasma torch, is partially melted, and the fluid metal particles are agglomerated by rotating the furnace, and thus the metal is removed from the dispersed mixture, wherein metallic aluminum and alumina, that is aluminum oxide, are obtained. Air or air that has been enriched with oxygen, nitrogen, and gases of this kind, which react with aluminum, in particular gases that have an oxidizing action, is used as the plasma gas. As a result of an exothermic reaction with the plasma gas, the heating time and melting time of the charge is in fact reduced, however a metal loss occurs due to a melting loss or oxidation and as a result, a dedusting of the exhaust gases is required for the most part and the metal yield is reduced.

Furthermore, processes for obtaining the metal phase from a dispersed mixture have been disclosed in which the fluid metal is coalesced and then solidified. According to WO-A2-93/01321, in a first step, a disintegration of the mixture disposed in an ingot mold at an increased temperature and a coalescing of the fluid metal portion is achieved by centrifuging, after which in a second step, a solidification of the metal into a hollow body is carried out. An improvement and simplification of a process of this kind can be achieved (EP-626 458 A1) if the dispersed mixture is disintegrated at high temperature in one step with the use of an acceleration in an ingot mold, the metallic phase is coalesced and collected in the region of the ingot mold surface, cooled and allowed to solidify.

In order to improve a metal removal from dispersed mixtures of light metal and non-metallic phases, as has been disclosed by AT 400 448 B or EP-548 654 A1, to form a charge, the mixture is introduced into a processing or preparation vessel, the charge is superheated, a uniform temperature distribution is adjusted, and the phases are kept dispersed by movement, after which the homogenized charge is removed from the preparation vessel and placed in a disintegration device. The expenditure, which is high for technical machining reasons, and the complex course of the process, though, can be seen as disadvantageous.

All previously disclosed metal removal processes as well as devices for carrying out a metal removal from dispersed mixtures, in particular from dross, produce an insufficiently high metal yield and/or require a high expenditure for technical machining reasons and/or have a poor thermal efficiency when the metal is put back into a molten mass, and for the most part, cannot sufficiently prevent problems in a removal of residues.

SUMMARY OF THE INVENTION

The invention will take remedial action in this connection and its object is to eliminate the disadvantages of the known metal reclamation processes and to disclose a process with which light metals can be simply reclaimed in fluid form with a high metal removal gradient from a dispersed mixture and can be reintroduced, for example, into a molten mass of metal. A further object of the invention is also comprised in creating a device for removing metal from dispersed mixtures, which is simple in design and can have a compact embodiment, has a low structural height, and permits an economical execution of the process.

The object is achieved with a process of the kind mentioned at the beginning, by means of this sequence of steps:

introduction of the dispersed mixture into a metallurgical vessel heating and/or adjusting the charge to a temperature of 20 to 250° C. above the liquidus temperature of the metal phase homogenization and production of high pourability of the charge by means of rolling mixing uniform distribution of the dispersed mixture, which has been produced to be pourable, around the rotational axis of the metallurgical vessel build-up of a radial acceleration of the mixture of at least 1 g maintenance of the radial acceleration for at least 0.015 hours for metal removal or disintegration decrease of the radial acceleration to the value 0 in a span of time greater than 0.03 hours pouring out of the metallic phase from the metallurgical vessel removal of the non-metallic phase or phases from the metallurgical vessel.

The advantages achieved with the invention are essentially comprised in that a high metal removal gradient from dispersed mixtures of light metal and non-metallic phases can be achieved in a simple and economical manner in only one metallurgical vessel by means of a sequence of process steps which have been tuned to one another. By means of an introduction, an adjustment to a desired temperature, a production of a high pourability, and a uniform distribution around the rotation axis, a corresponding preparation of the dispersed mixture in the vessel is carried out in order to then be able to achieve a high metal removal gradient because favorable disintegration conditions are set in the charge or in the mixture. In the sequence of steps wherein in each of the preceding steps, the necessary prerequisites are met for a high process efficiency, the use of a particular radial acceleration cycle is important for an essentially complete removal of metal from the dispersed mixture. It is particularly important to control the build-up and in particular, the decrease of the radial acceleration, by means of which it is unexpectedly possible to prevent a remixing of the metal back into the region of the non-metallic phases, and finally to be able to pour out only the metallic phase. For this, the non-metallic part can be held back for the time being with a kind of skimmer or siphon, from which the non-metallic compounds can easily be removed or emptied only after the metal has been poured out. However, it is also possible if the metal removal gradient of the process was insufficient, for example due to incorrect parameter setting in the process steps, to leave the charge in the metallurgical vessel, if need be to add an additional charge to it, and after this in turn, to allow a metal removal process with the sequence of steps according to the invention to run its course in order to achieve the maximum fluid metal yield. It is particularly advantageous if the heating as well as the homogenization and adjustment of pourability of the dispersed mixture is carried out at a radial acceleration of the mixture of at most 0.39 g with or by means of the rotation of the metallurgical vessel at a rotational axis inclination to the vertical of 85 to 45∠°, preferably 45 to 20∠°, because the homogenization conditions are set in a particularly favorable manner as a result.

Although in a vertical rotation of the metallurgical vessel, a gravity-induced overlapping vibration action on the charge, which action encourages metal removal, does not occur, it has been discovered to the complete surprise of one skilled in the art that in terms of its action, the process can be carried out in a particularly favorable and easy manner if the dispersed mixture is subjected to a metal-removing radial acceleration essentially in a direction perpendicular to the acceleration due to gravity. It is important that after a metal removal in the essentially vertical axis position of the metallurgical vessel, the radial acceleration is brought to the value 0 in order to prevent a renewed mixing effect of the phases. Furthermore, it can be advantageous if for the time being, the metallic phase is simply poured out through the feed opening of the metallurgical vessel by means of tilting it. In the end, it can turn out below to be favorable for a high metal yield if, as previously indicated, after the metallic phase is poured out, the part remaining in the metallurgical vessel is not removed, but is subjected to a further radial acceleration.

The other object of the invention is attained with a device of the kind explained at the beginning, by virtue of the fact that the metallurgical vessel which is shaped in an essentially rotationally symmetrical manner, is connected to a tilting device, which has two or more working positions with a respectively different axis direction or axis inclination and a total tilt angle of the vessel of at least 106∠°, and can be driven to rotate around the axis at two or more speeds.

A device embodied in this way not only can be produced in a compact construction, but is also highly flexible and effective for technical application reasons.

Both a cooled dispersed mixture and immediately accumulating dross can be processed with the highest metal removal gradient using a vessel that has a highly durable vessel wall, if the inner chamber of the metallurgical vessel and/or the dispersed mixture disposed in it can be heated and if the vessel has a fireproof lining.

Furthermore, if in the tilting region, the metallurgical vessel has at least one working position for a rolling mixing of the charge with an angle (β) of the rotational axis to the vertical in the region of 85 to 45∠° and has an essentially vertical working position for exerting a disintegrating radial acceleration, an advantageous circulation for achieving a rapid temperature increase or a rapid temperature adjustment as well as an effective homogenization and an adjustment of a high degree of pourability of the charge are possible and favorable conditions for uniform distribution of the mixture and an effective disintegration of the mixture are assured. It is of particular advantage if in at least one working position provided for the rolling mixing of the charge, the metallurgical vessel can be driven at a rotation speed $N_1$ in (1/sec), which is less than a computed value according to the formula and/or require a high expenditure for technical machining reasons and/or have a poor thermal efficiency when the metal is put back into a molten mass, and for the most part, cannot sufficiently prevent problems in a removal of residues.

The invention will take remedial action in this connection and its object is to eliminate the disadvantages of the known metal reclamation processes and to disclose a process with which light metals can be simply reclaimed in fluid form with a high metal removal gradient from a dispersed mixture and can be reintroduced, for example, into a molten mass of metal. A further object of the invention is also comprised in creating a device for removing metal from dispersed mixtures, which is simple in design and can have a compact embodiment, has a low structural height, and permits an economical execution of the process.

The object is achieved with a process of the kind mentioned at the beginning, by means of this sequence of steps:

introduction of the dispersed mixture into a metallurgical vessel heating and/or adjusting the charge to a temperature of 20 to 250° C. above the liquidus temperature of the metal phase homogenization and production of high pourability of the charge by means of rolling mixing uniform distribution of the dispersed mixture, which has been produced to be pourable, around the rotational axis of the metallurgical vessel build-up of a radial acceleration of the mixture of at least 1 g maintenance of the radial acceleration for at least 0.015 hours for metal removal or disintegration decrease of the radial acceleration to the value 0 in a span of time greater than 0.03 hours pouring out of the metallic phase from the metallurgical vessel removal of the non-metallic phase or phases from the metallurgical vessel.

The advantages achieved with the invention are essentially comprised in that a high metal removal gradient from dispersed mixtures of light metal and non-metallic phases can be achieved in a simple and economical manner in only one metallurgical vessel by means of a sequence of process steps which have been tuned to one another. By means of an introduction, an adjustment to a desired temperature, a production of a high pourability, and a uniform distribution around the rotation axis, a corresponding preparation of the dispersed mixture in the vessel is carried out in order to then be able to achieve a high metal removal gradient because favorable disintegration conditions are set in the charge or in the mixture. In the sequence of steps wherein in each of the preceding steps, the necessary prerequisites are met for a high process efficiency, the use of a particular radial acceleration cycle is important for an essentially complete removal of metal from the dispersed mixture. It is particularly important to control the build-up and in particular, the decrease of the radial acceleration, by means of which it is unexpectedly possible to prevent a remixing of the metal back into the region of the non-metallic phases, and finally to be able to pour out only the metallic phase. For this, the non-metallic part can be held back for the time being with a kind of skimmer or siphon, from which the non-metallic compounds can easily be removed or emptied only after the metal has been poured out. However, it is also possible if the metal removal gradient of the process was insufficient, for example due to incorrect parameter setting in the process steps, to leave the charge in the metallurgical vessel, if need be to add an additional charge to it, and after this in turn, to allow a metal removal process with the sequence of steps according to the invention to run its course in order to achieve the maximum fluid metal yield. It is particularly advantageous if the heating as well as the homogenization and adjustment of pourability of the dispersed mixture is carried out at a radial acceleration of the mixture of at most 0.39 g with or by means of the rotation of the metallurgical vessel at a rotational axis inclination to the vertical of 85 to 45∠°, preferably 45 to 20∠°, because the homogenization conditions are set in a particularly favorable manner as a result.

Although in a vertical rotation of the metallurgical vessel, a gravity-induced overlapping vibration action on the charge, which action encourages metal removal, does not occur, it has been discovered to the complete surprise of one skilled in the art that in terms of its action, the process can be carried out in a particularly favorable and easy manner if the dispersed mixture is subjected to a metal-removing radial acceleration essentially in a direction perpendicular to the acceleration due to gravity. It is important that after a metal removal in the essentially vertical axis position of the metallurgical vessel, the radial acceleration is brought to the value 0 in order to prevent a renewed mixing effect of the phases. Furthermore, it can be advantageous if for the time being, the metallic phase is simply poured out through the feed opening of the metallurgical vessel by means of tilting it. In the end, it can turn out below to be favorable for a high metal yield if, as previously indicated, after the metallic phase is poured out, the part remaining in the metallurgical vessel is not removed, but is subjected to a further radial acceleration.

The other object of the invention is attained with a device of the kind explained at the beginning, by virtue of the fact that the metallurgical vessel which is shaped in an essentially rotationally symmetrical manner, is connected to a tilting device, which has two or more working positions with a respectively different axis direction or axis inclination and a total tilt angle of the vessel of at least 106∠°, and can be driven to rotate around the axis at two or more speeds.

A device embodied in this way not only can be produced in a compact construction, but is also highly flexible and effective for technical application reasons.

Both a cooled dispersed mixture and immediately accumulating dross can be processed with the highest metal removal gradient using a vessel that has a highly durable vessel wall, if the inner chamber of the metallurgical vessel and/or the dispersed mixture disposed in it can be heated and if the vessel has a fireproof lining.

Furthermore, if in the tilting region, the metallurgical vessel has at least one working position for a rolling mixing of the charge with an angle (β) of the rotational axis to the vertical in the region of 85 to 45∠° and has an essentially vertical working position for exerting a disintegrating radial acceleration, an advantageous circulation for achieving a rapid temperature increase or a rapid temperature adjustment as well as an effective homogenization and an adjustment of a high degree of pourability of the charge are possible and favorable conditions for uniform distribution of the mixture and an effective disintegration of the mixture are assured. It is of particular advantage if in at least one working position provided for the rolling mixing of the charge, the metallurgical vessel can be driven at a rotation speed N1 in (1/sec), which is less than a computed value according to the formula:

$$N_1 = Y\sqrt{\frac{2}{A}}$$

wherein Y represents a mixing constant with a coefficient of measure of 12.12 and the value A represents the inner diameter of the vessel in (m) and if, in a further embodiment of the invention, in the essentially vertical working position, the metallurgical vessel can be driven at a rotation speed (N2) in (1/sec), which is greater than the computed value according to the formula:

$$N_2 = X\sqrt{\frac{2}{A}}$$

wherein X represents a separation constant with a coefficient of measure of 28.55 and the value A represents the inner diameter of the vessel in (m). Not only the course of the process, but also the separation efficiency of the metal can thus be decisively improved.

In the end, for an effective separation of phases, it can be advantageous if, at least for pouring the metallic phase out from the metallurgical vessel, the vessel's feed opening can be partially closed by a covering means.

BRIEF DESCRIPTION OF THE DRAWINGS

The invention is explained in detail below in conjunction with drawings that represent only one manner of embodiment.

DETAILED DESCRIPTION OF THE INVENTION

Figure 1:
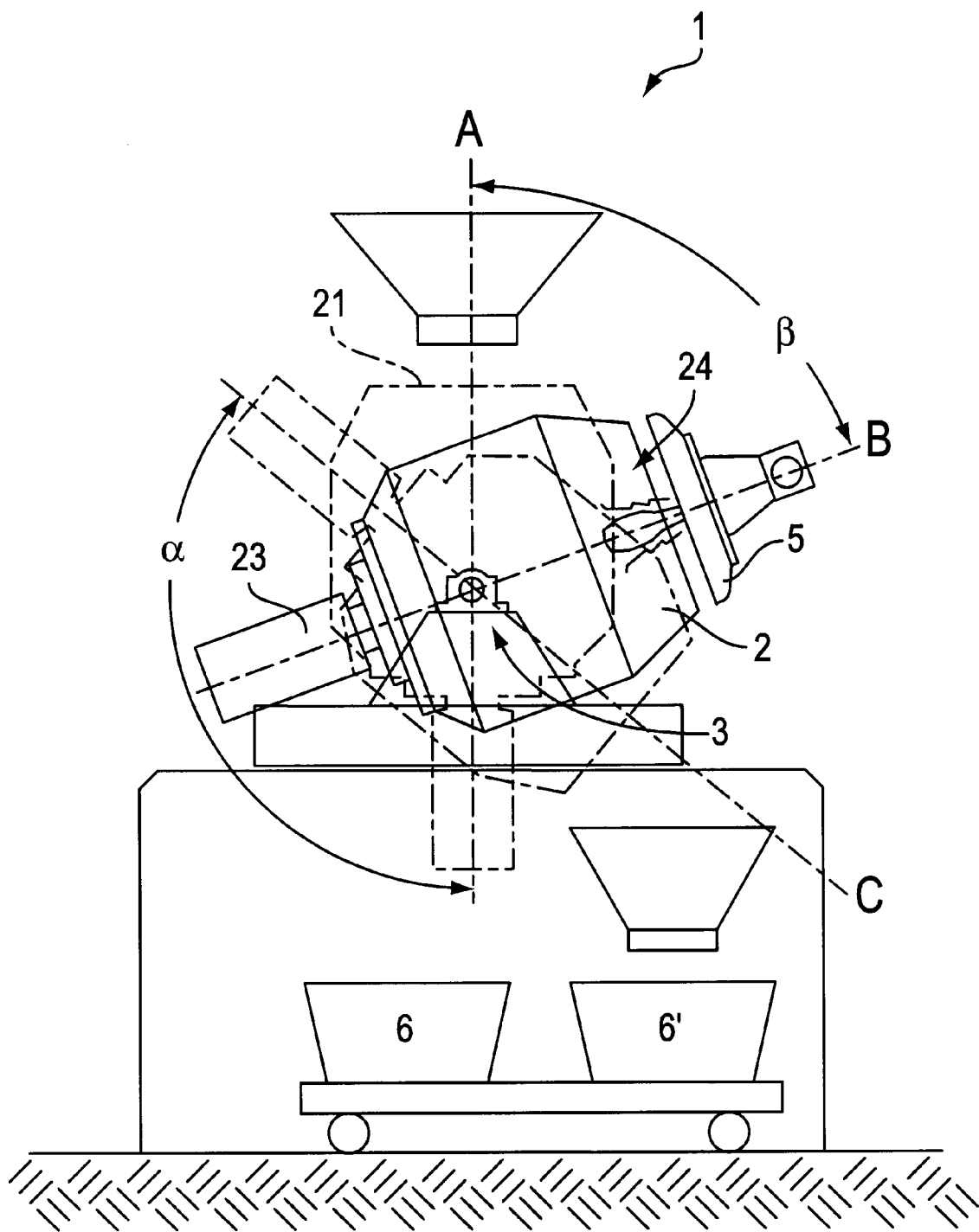
FIG. 1 shows a schematic side view of a device according to the invention

In FIG. 1, a metallurgical vessel 2 is shown in a working position B, where two other working positions are indicated, a position A having a vertically aligned axis 21 with a feed opening 24 directed upward and an inclined position C, in which the feed opening 24 is directed downward with an axis position rotated by an angle α to the vertical. A process according to the invention can run in a sequence in such a way that a vessel 2, if need be in a position B, is preheated with a burner 5, wherein the burner can be placed over a vessel feed opening 24.

After a desired preheating of the walls 22, the heating device 5 is removed from the feed opening 24 and the vessel 2 is tilted or pivoted into an essentially vertical position A of the axis 21, if need be, dross or the like is introduced into the vessel 2 via the feed opening 24, for example by means of a funnel 71. After the introduction of a charge, the vessel 2 is tilted into an axis position B and furthermore rotated around the axis 21, carried out by a rotation means 23, for example a drive motor that can be regulated. This rotational movement of the vessel 2 in axis position B, which motion is used to produce a homogenization and a setting of a high degree of pourability of the dispersed mixture, during which the fresh dross can be heated by a burner 5 or cooled by the introduction of cold, is carried out at a radial acceleration of the charge of less than 0.39 g. A subsequent pivoting of the vessel 2 into an essentially vertical working position A can be carried out at a reduced radial acceleration because in this way, a uniform distribution of the liquified charge around the rotational axis 21 is supported. In the vertical axis position A, the speed is increased and thus a radial acceleration of the mixture is increased to a value of more than 1 g. This high radial acceleration, which value can also be changed up to 26% in pulsating fashion, is maintained for at least 0.015 hours in order to achieve an essentially complete disintegration of the phases or a de-metallization of the charge, after which the speed is reduced down to zero over a time span of more than 0.03 hours. Higher braking rates of the rotating vessel 2 usually cause a remixing of the disintegrating phases. When the vessel 2 reaches a stop, it is tilted with its feed opening 24 downward, for example in an axis direction C, the non-metallic phases are retained in the vessel and the fluid metal is poured out into a tub 6'. Then, a tub wagon can be moved and after the removal of the retaining means, the nonmetallic or de-metallized phases can be removed into another tub 6.

Figure 2:
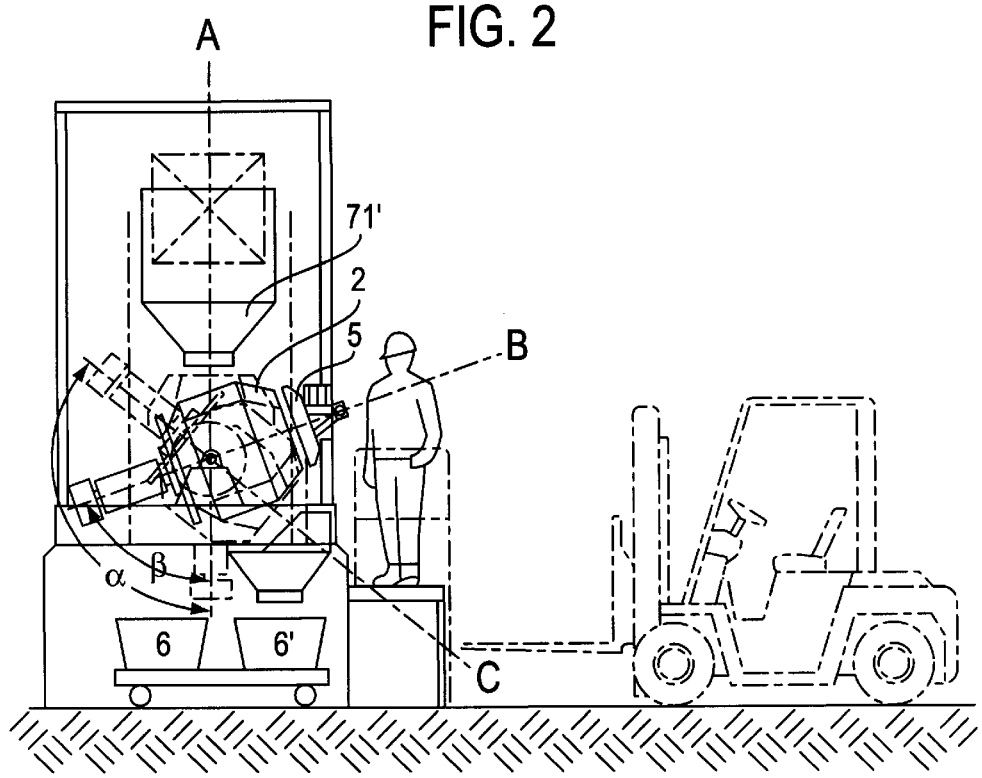
FIGS. 2 and 3 show a side view and a front view of a device in an environmentally protective cubicle.
Figure 3:
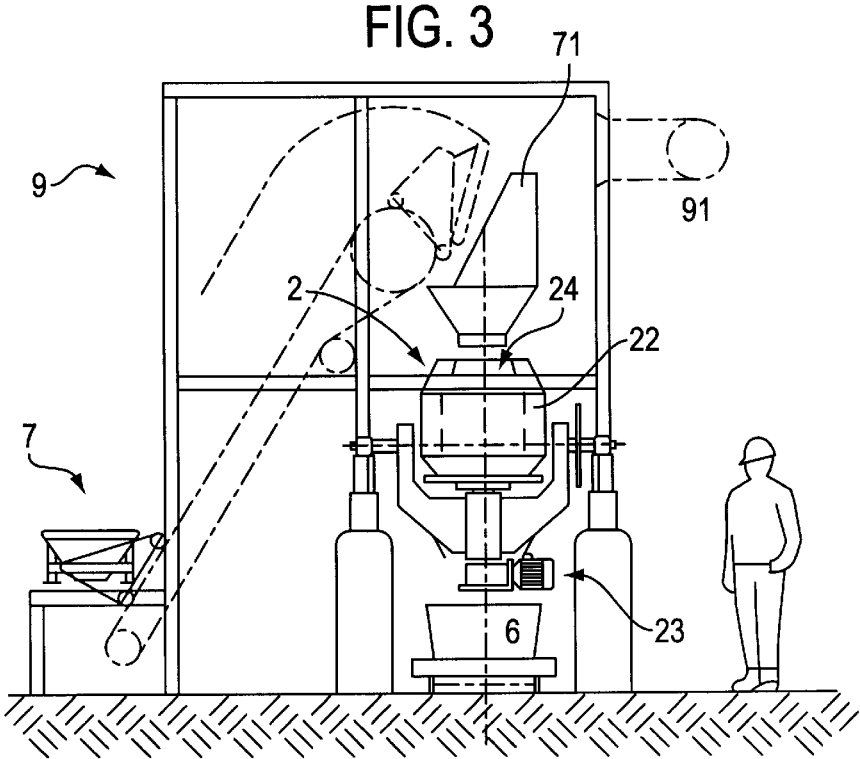

FIGS. 2 and 3 show a side view and a front view of a device with a charging or insertion device 7. A dispersed mixture is fed from a charging receptacle 7 via a delivery means 71 into a feed opening 24 of a vessel 2 lined with fireproof material. To prevent environmental strain, the system is set up in an isolation chamber 9 with a gas discharge 91.

What is claimed:

1. A process for obtaining a metallic phase from a dispersed mixture composed of one of (a) at least one metal selected from the group consisting of a light metal or an alloy of the at least one metal, and mixtures thereof, and (b) at least one non-metallic phase composed of at least one member selected from the group consisting of at least one oxide, an oxide compound, and other compounds of the at least one metal at higher temperatures, the process comprising:

introducing the dispersed mixture into a metallurgical vessel;

at least one of heating and adjusting a temperature of the dispersed mixture to between 20 and 250° C. above the liquidus temperature of the metallic phase;

rotating the metallurgical vessel to homogenize the dispersed mixture and to produce a pourable dispersed mixture;

uniformly distributing the pourable dispersed mixture around a rotational axis of the metallurgical vessel;

increasing a radial acceleration of the pourable dispersed mixture of at least 1 g;

maintaining the radial acceleration for at least 0.015 hours to one of separate the metallic phase of the pourable dispersed mixture from the non-metallic phase of the pourable dispersed mixture and de-metallize the pourable dispersed mixture;

decreasing the radial acceleration to a value of 0 in a span of time greater than 0.03 hours;

pouring the metallic phase as a fluid out of the metallurgical vessel; and after pouring the metallic phase out of the metallurgical vessel, removing the at least one non-metallic phase from the metallurgical vessel.

2. The process according to claim 1, wherein the dispersed mixture further comprises additional substances comprising at least one of salt and salt mixtures.

3. The process according to claim 1, wherein the dispersed mixture is composed of dross obtained in processes for producing, processing, and reclaiming aluminum and aluminum alloys.

4. The process according to claim 1, wherein the rotation of the metallurgical vessel for homogenizing and producing the pourable dispersed mixture is rotated about a rotational axis oriented at an angle between 85° and 45° to vertical to produce a radial acceleration of the mixture of at most 0.39 g.

5. The process according to claim 4, the rotational axis being oriented at an angle between 45° and 20° to vertical.

6. The process according to claim 1, further comprising:

subjecting the pourable dispersed mixture to a metal-separating radial acceleration essentially in a direction perpendicular to the acceleration due to gravity.

7. The process according to claim 1, wherein, when the metallurgical vessel is arranged in a substantially vertical position, the radial acceleration is brought to the value of 0.

8. The process according to claim 1, wherein the metallic phase is poured out through a feed opening of the metallurgical vessel by tilting the vessel.

9. The process according to claim 1, wherein, after the pouring out of the metallic phase, the method further comprising:

one of removing the non-metallic phase remaining in the metallurgical vessel and subjecting the non-metallic phase remaining in the metallurgical vessel to another radial acceleration.

* * * * *